US00RE40714E

(19) United States
(12) Reissued Patent
Dabney et al.

(10) Patent Number: US RE40,714 E
(45) Date of Reissued Patent: May 19, 2009

(54) METHOD AND SYSTEM FOR OPERATING A CONTENT MANAGEMENT SYSTEM WITH SPECIFIC EDITING CAPABILITIES

(75) Inventors: Michael Blane Dabney, Dallas, TX (US); David Thomas Hill, Fort Worth, TX (US); Lourdes Maria Trujillo, Grand Prairie, TX (US); Melda Marie Washington, Dallas, TX (US); Ronald Gene Lee, Hurst, TX (US); James C. Jennings, III, Dallas, TX (US); Christopher J. Feola, Grapevine, TX (US)

(73) Assignee: The Belo Company, Wilmington, DE (US)

(21) Appl. No.: 10/912,771

(22) Filed: Aug. 4, 2004

Related U.S. Patent Documents

Reissue of:
(64) Patent No.: 6,643,663
Issued: Nov. 4, 2003
Appl. No.: 09/415,560
Filed: Oct. 8, 1999

(51) Int. Cl.
*G06F 17/30* (2006.01)
*G09G 5/00* (2006.01)

(52) U.S. Cl. ..... 707/102; 707/1; 707/2; 707/3; 707/4; 707/10; 707/101; 707/103 R; 707/104.1; 709/218

(58) Field of Classification Search ..... 707/1, 707/2, 3, 4, 5, 6, 10, 101, 104.1, 103 R
See application file for complete search history.

(56) References Cited

U.S. PATENT DOCUMENTS 5,819,271 A * 10/1998 Mahoney et al. ..... 707/10
5,852,435 A * 12/1998 Vigneaux et al. ..... 345/428
5,862,325 A * 1/1999 Reed et al. ..... 709/201
5,864,871 A * 1/1999 Kitain et al. ..... 707/10
5,892,909 A * 4/1999 Grasso et al. ..... 709/201
5,905,981 A * 5/1999 Lawler ..... 707/3
5,937,418 A * 8/1999 Ferris et al. ..... 707/513
6,044,205 A * 3/2000 Reed et al. ..... 709/201
6,088,702 A * 7/2000 Plantz et al. ..... 345/733
6,141,007 A * 10/2000 Lebling et al. ..... 345/720
6,148,330 A * 11/2000 Puri et al. ..... 709/217
6,199,082 B1 * 3/2001 Ferrel et al. ..... 707/515

FOREIGN PATENT DOCUMENTS

WO WO 98-45789 * 10/1998
WO WO 98-45792 * 10/1998

OTHER PUBLICATIONS

"The Integration of a Newsroom Computer System with a Server–Centered News Production System," S. Vigneaux, Avid Technology, Inc., 1996 International Broadcasting Convention, Sep. 12–16, 1996 IEEE, pp. 512–518.*
"Hypernews, A Hypermedia Electronic—Newspaper Environment Based on Agents," Jen–Henry Morin, Proceedings of the 1998 International Conference on System Sciences, Jan. 6–9, 1998, IEEE, vol. 2, pp. 58–67.*

(Continued)

*Primary Examiner*—Hosain Alam
*Assistant Examiner*—Farhan M Syed
(74) *Attorney, Agent, or Firm*—Moore & Van Allen PLLC; W. Kevin Ransom

(57) ABSTRACT

The present invention is directed to a content management system for receiving, editing, and distributing data across a network. The method includes accessing the data stored in a database, presenting the data for inspection, and assigning the data to at least one target location for distribution. Another embodiment of the present invention is a user interface operating on a computing device for editing data in the content management system.

10 Claims, 15 Drawing Sheets

OTHER PUBLICATIONS

"KMi Planet: A Web Based News Server," Domingue et al., Proceedings of the 1998 Conference on Computer Human Interaction, IEEE, pp. 324–330.*

"FrontPage 98 for Windows 95," The Journal of the American Taxation Association, Fall, 1998, vol. 20, No. 2, pp. 132–134.*

"Microsoft FrontPage 98," Software review in Information Intelligence, Online Libraries, and Microcomputers, May 1998, vol. 16, No. 5, p. 1–4.*

"WebExpress Suits Novices," InfoWorld, May 11, 1998, vol. 20, No. 19, pp. 78–79.*

"Mixed Media: The New Push for Push Technology," Hal Berghel, ACM Press, NY, USA, 1998, pp. 28–36.*

Taschek, *The Scoop on Web Content Management*, PC Week Labs, Sep. 13, 1999.*

*Shoot–out Scorecard: Web Content Management Solutions*, PC Week, Sep. 13, 1999.*

Rapoza, *Today's Content Management Tools are bound for Obsolescence*, PC Week Labs, Sep. 13, 1999.*

*Reading between Cost Lines*, PC Week, Sep. 13, 1999.*

Rapoza, *Steps to Ensuring System Scalability*, PC Weeks Labs, Sep. 13, 1999.*

Rapoza, *PC Week Shoot–Out Chronicle, Tests Show that Workflow, Publishing Capabilities, Scalability are Determining Factors*, PC Week Labs, Sep. 13, 1999.*

*Go With The Flow*, PC Week, Sep. 13, 1999.*

Gunnerson, *From the Trenches*, PC Week corporate Partner, Sep. 13, 1999.*

* cited by examiner

METHOD AND SYSTEM FOR OPERATING A CONTENT MANAGEMENT SYSTEM WITH SPECIFIC EDITING CAPABILITIES

Matter enclosed in heavy brackets [ ] appears in the original patent but forms no part of this reissue specification; matter printed in italics indicates the additions made by reissue.

BACKGROUND OF THE PRESENT INVENTION

1. Field of the Invention

The present invention relates generally to a method and system for operating a content management system.

2. Description of the Related Art

Content management systems have been used primarily as repositories for storing vast amounts of data. In general, these content management systems (CMS) are designed by engineers who are not day-to-day operators on a content management system. While these content management systems provide comprehensive technical infrastructures, they fail to provide operators of the systems with simple and intuitive solutions for using the systems to achieve particular tasks. The content management systems currently available provide an open architecture, which allows the system engineer for the content management system to then design and develop a customized system for a particular application or workflow. Allowing the system to be so flexible is actually a problem for most system engineers and operators of the system because the open architecture requires that the operators, such as human editors, be proficient, if not experts, in the design and operation of the content management system. This further forces the system engineer to spend much time and money in developing a customized system for a specific application. In other words, the content management systems are not out-of-the-box ready to operate for a given task.

To design and customize a content management system, the system engineer must know the HTML programming language, or the specific programming language for the particular content management system being used. Additionally, when designing these systems, depending upon the particular system configuration, the system engineer must create bridges, which are hardware and/or software systems that convert machine hardware and software specific data to a different machine hardware and software specific data, when the content management system is connected in a network environment. Additionally, the system engineer must also create an interface link, which is often times a script program, to allow a user interface to interact with the content management system.

The content management system includes a database for storing data received by the content management system. A problem with content management systems in the past has been that database storage is limited in size for various stability reasons and is not easily scalable. Another problem that exists is that the databases are not "farmable". A farmable database is a single database that is extended by having the database physically located on more than one storage device. By farming the database, the amount of data that can be stored in the database is virtually limitless.

One of the subtle, yet integral problems for content management systems, is the workflow that the system is designed to follow. Workflow refers to a certain methodology and procedure implemented by an organization to perform a certain task. For example, a news publishing organization utilizes a certain workflow in publishing its new stories or data that covers the process from the time that a story is written to the time it is published.

The physical process of publishing news stories is not the complete task as envisioned by quality news organizations and certainly not the purpose for using a content management system. By physical process, it is meant that the data is physically copied and pasted from one file into another, which is published and distributed to, for instance, a web page. Quality news organizations require proper editorial workflow and data management, which includes review, edit, layout, and delivery of the data. While the physical process is necessary, the actual steps to implement the physical process have, in the past, been cumbersome and time consuming by requiring extra unnecessary steps for the human (web) editor.

While the physical process may be a necessary step, an intellectual process is also required. This intellectual process is the idea of fitting a particular workflow paradigm into the reality of publishing, for example, a news story from a traditional media format to an online environment. This intellectual process is very difficult to generate from the present content management systems available. Additionally, the web editor is required to know the HTML programming language or a specific programming language for the content management system being used, which is often more than a web editor needs or wants to know. Workflow, as required to be performed to streamline a news publishing organization, for example, is thus impeded by content management system overhead.

Editorial workflow is a very important concept for understanding the operation of a content management system. The usefulness of the content management system in, for instance, a news organization is only as good as its seamlessness with the editorial workflow. Editorial workflow means to provide news stories and other associated data in a certain fashion such that the stories and data are properly edited and posted in a publication (for a traditional news source) and on a web page (for an electronic or online news source).

A content management system used for publishing news stories on, for example, the worldwide web or internet, must first receive data from a news organization and then allow web editors to review and accept or approve the data to be published. This publishing operation is not simply a matter of receiving the data electronically and placing the data onto a web page, but requires that the web editor review, edit, assign, and approve the data so that the data can be exported to assigned target locations, most typically web pages.

In general, the available content management systems are simply set up as repositories for data with limited publishing capabilities with complimentary web serving capabilities. Because of the rudimentary environment and capabilities of currently available content management systems, web editors are basically limited to reviewing the data in the database, copying the data into a content management system, and placing the data in a flat file system, such as a particular web page.

A user interface provides the web editor with the capability to edit the data stored in the database on the content management system. Because content management systems in the past were designed by engineers (i.e., not necessarily those who would eventually be operators of the system), the user interface was tailored more as a high level file management system as opposed to an efficient tool for handling the data. The currently available user interfaces do not provide sufficient information to assign the data by simply looking at the information provided on the front end of the user interface. Because insufficient information is readily available, multiple operations are required to be performed by the web editor to determine target location(s) for the data to be assigned. Because the content management systems have limited "front end" interfaces, the web editor is also required to physically move files within the user interface much the same way one would move files within a file structure in a graphical operating system.

In addition to the above discussed shortcomings of the past content management systems, no source indicators indicate where the file was originated. Even more troublesome to web editors is that all the data within a specific data record (e.g., a single news story) is contained in a text field so that a web editor is required to sift through various computer codes containing header information within a text editor in order to determine important information, such as author, headline, and date published.

While there are content management systems to serve very large systems, these content management systems are specifically designed to serve web pages. In other words, these content management systems are tailored to creating web pages and not necessarily serving the data that is to be posted on the web page. These systems may serve a web site with potentially three hundred or more web pages.

To summarize the problems of currently available content management systems one must recognize that these systems are difficult to use, inefficient, unstable and expensive. The difficulty for using the currently available content management systems is that these systems require the system engineer to develop and tailor his or her own system using a specific programming language, such as JAVA or HTML. The system engineer must also design and develop interfaces to the server supplying the data to the content management system and to the server or computers that have the user interfaces interacting with the content management system. Additionally, the web editors are required to understand the particular programming language that is used to manage and store the data. Working with the currently available content management systems also is inefficient in that they require several steps to perform what preferably should be a single step operation. There are many other time intensive operations in currently available content management systems that make it difficult and frustrating for the web editor to do his or her everyday tasks.

Content management systems are expensive to buy, maintain, and operate. Currently available systems, again, require that the system engineer develop and design a system appropriate for the needs of the operator of that system. Because the working environment on currently available systems is so inefficient, operating costs for the operator are quite substantial. Maintaining presently available content management systems is also a formidable task as these systems have stability problems due to the techniques used for handling and storing the data.

SUMMARY OF THE INVENTION

The present invention is directed to a content management system for receiving, editing, and distributing data across a network. The content management system is designed in a preferred embodiment to handle a certain workflow within an online publishing environment, which allows operators of the content management system to more efficiently perform routine publishing tasks.

A first embodiment of the invention is a method for preparing data to be distributed on a network maintained by a content management system. The method includes accessing the data stored in a database, presenting the data for inspection, and assigning the data to at least one target location for distribution.

A second embodiment of the present invention is a system for operating a content management system that has a first computing device having a processor and a storage device for storing a database. A second computing device is connected to the first computing device and at least one of the first and second computing devices performs the steps of accessing the data stored in the database, presenting the data for inspection, and assigning the data to at least one target location for distribution.

Another embodiment of the present invention is a user interface operating on a computing device for editing data within a database in the content management system. The user interface includes a connection to the database so that the data may be accessed. This embodiment also includes a graphical user interface having at least two regions displaying the data in a format which allows an operator of the user interface to inspect the data in the database. A selecting means is available for choosing at least one data record in the first region. A second region displays the contents of the data record that was selected from the first region.

Another embodiment of the present invention includes a content management system for collecting, editing and distributing data in a database having a certain configuration. A first computing device operates as a server and is connected to a second computing device. The first computing device further operates at least one database to store the data to be accessed by the second computing device. The content management system has a feature to access the database so that data may be assigned to at least one target location for the data to be exported to at least one third computing device. The first computing device further has an exporting feature to transmit the data to the assigned target location(s).

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
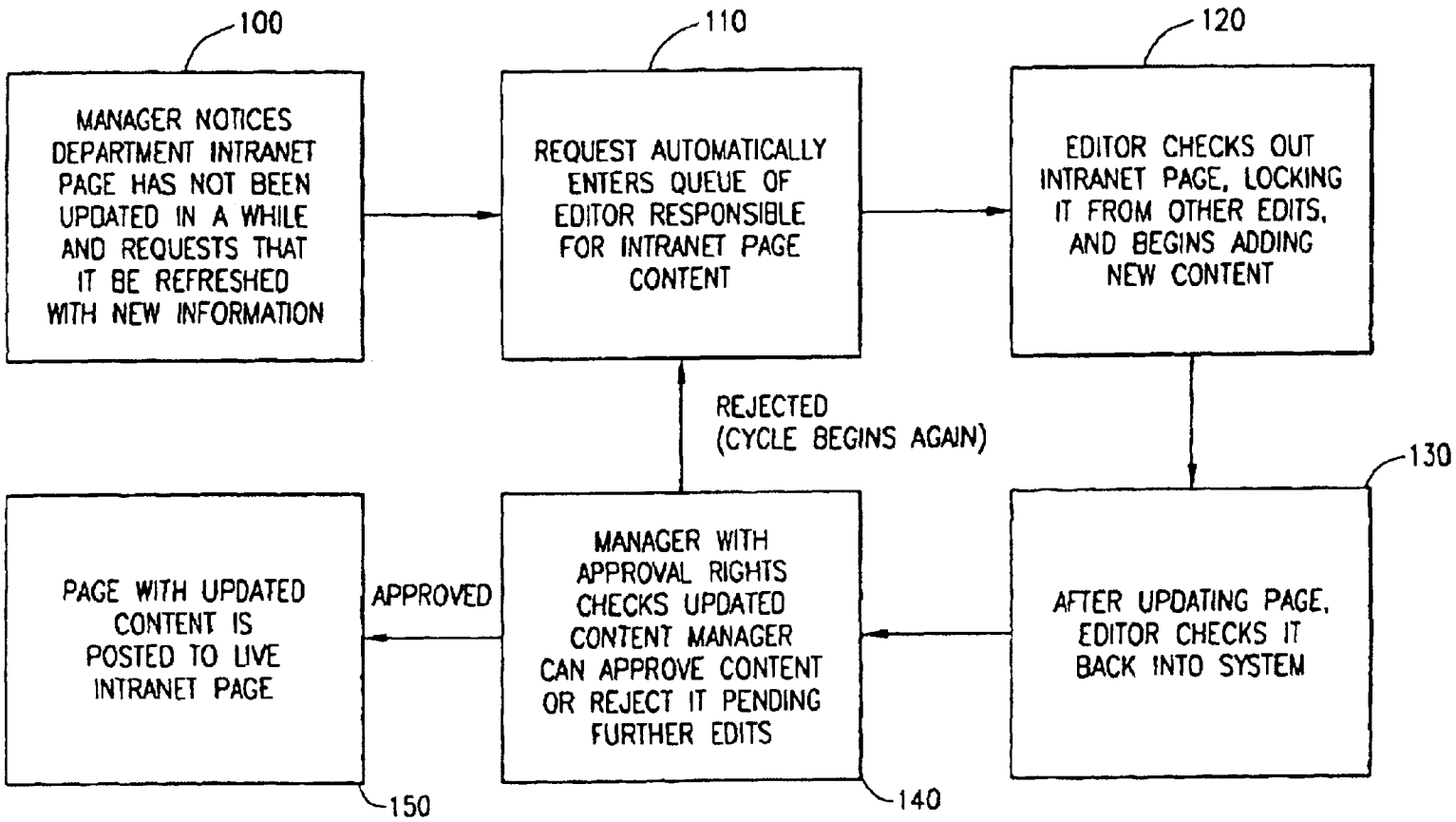
FIG. 1 is a block diagram of an exemplary corporate intranet management workflow.

FIG. 1 is a flow diagram for an exemplary corporate intranet workflow. Step 100 indicates that a manager notices his department intranet page has not been updated in a while and requests that it be refreshed with new information. At step 110, the manager's request is automatically entered in a queue of the editor who is responsible for maintaining the intranet page content.

At step 120, the editor checks out the intranet page, which locks it from other edits from occurring while the editor edits the intranet page and the editor adds new content matter. At step 130, once the editor finalizes his edits to the intranet page, the intranet page is checked back into the system. At step 140, a manager having approval rights reviews the updated content in the intranet page. If the intranet page is approved, the intranet page is updated and posted to the live intranet page at step 150. If, however, the manager with approval rights rejects the updated content in the intranet page, the workflow directs that a request is automatically entered into the queue of the responsible editor again.

It should be understood that the corporate intranet workflow in FIG. 1 is representative of how a typical corporation might maintain its intranet. Such a desired workflow for maintaining a corporate internet may also be modeled as presently shown in FIG. 1. The present invention may be designed to perform the functions to manage the corporate intranet based upon the workflow.

Figure 2:
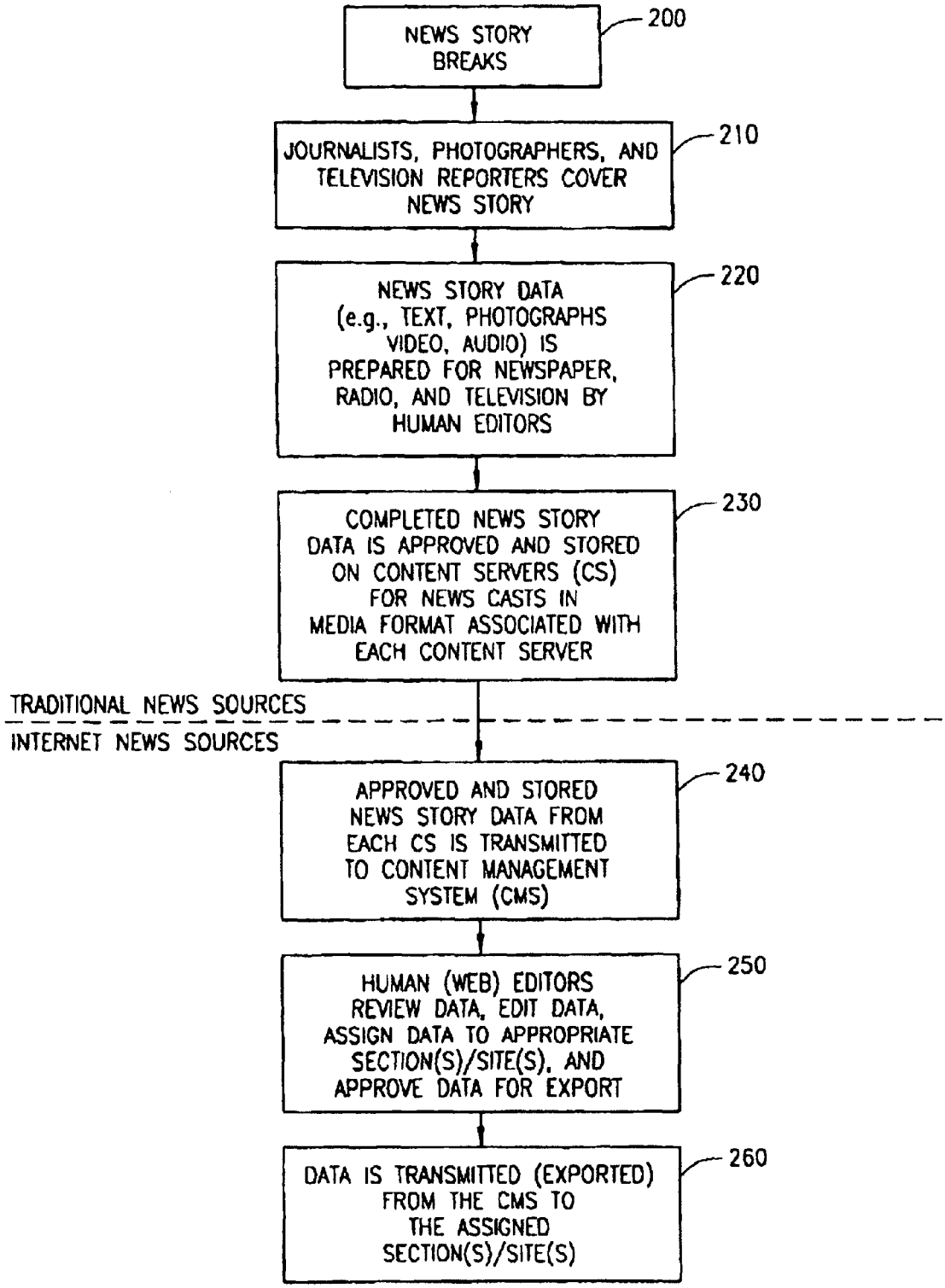
FIG. 2 is a block diagram of an exemplary news industry workflow.

FIG. 2 is an exemplary flow diagram of a news industry workflow. The workflow shown is a typical flow of handling news stories provided by news reports and/or journalists to be published in a newspaper or other traditional media source. As is indicated, the workflow for traditional news sources is indicated as being represented by the flow diagram portion above the dashed line and the workflow for internet or online news sources is indicated as being represented by the flow diagram portion below the dashed line.

At step 200, a news story breaks. At step 210, journalists, photographers, and television reporters arrive at the news scene to cover the news story.

At step 220, news story data (e.g., text, photographs, video, audio) is prepared for newspaper, radio, and television by human editors. In preparing the news story data, human editors edit the news story data on a computing device, such as a content server (CS), for content and format for the particular type of news media that will present the data to the public.

At step 230, the completed new story data is approved by the news editors and stored on the content servers for news casts and media distribution. The content server is a computer server having at least one database that stores the data to be distributed to particular types of news media. When the new story data is approved and stored on the content server, the data becomes available for news media to incorporate the edited news story data into their broadcast and/or publication distribution. At the same time, the news story data is available for internet news sources to receive.

At step 240 the approved and stored news story data from each content server is transmitted to a content management system (CMS). The content management system is a hardware and software system that stores and manages data. In the content of the news industry, the data typically includes text, video, audio, photographs, and drawings (i.e., multimedia).

At step 250, a human editor ("web editor" or operator) reviews and edits the data stored in the content management system and assigns the data to target locations appropriate for the data to be assigned and approves the data for use in a webpage. It should be understood by data, it is meant that data stored in the database is the aggregate of multiple data records (e.g., new story, photograph, video image, and audio clip), and each data record includes data elements (e.g., author, date, new story copy, and source organization). The function of a web editor is to review the data records and ensure their content for web publication and to assign each data record to target location(s) for later export.

A target location is a section within a site, such as a science section within a online newspaper. It should be noted that the news story data has been edited by human editors and the traditional news media, so that it is generally not necessary for web editors to perform much additional editing. However, there are times when a web editor may be required to modify stories for content and format website publication.

At step 260, the data is transmitted from the content management system to the assigned target location. To perform this data transmission, the content management system has software to automatically export the data to the assigned target locations when the data is approved. The data is exported across a network to other computing devices hosting the assigned target location(s).

Figure 3A:
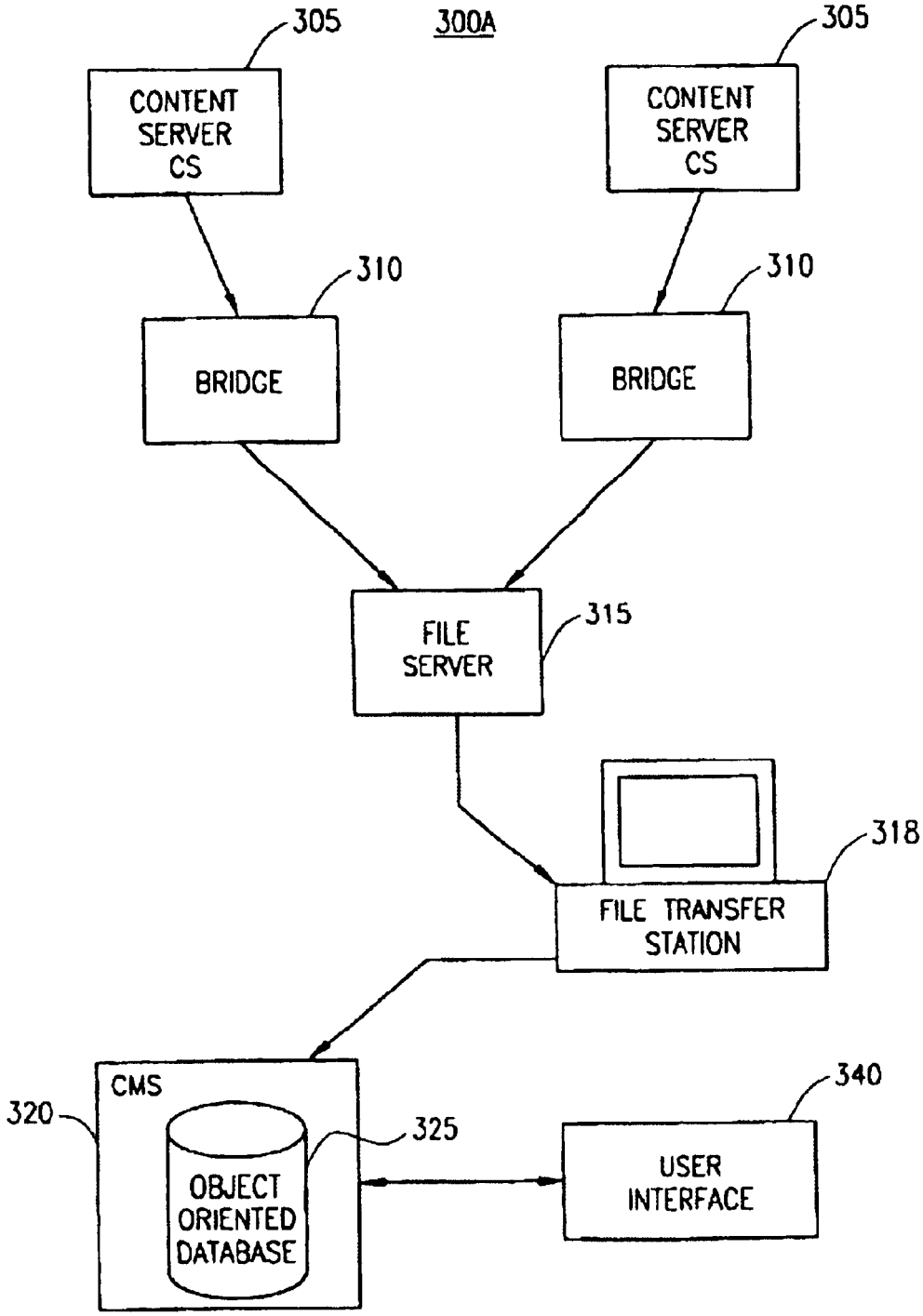
FIG. 3A is a block diagram of an exemplary network structure that includes a content management system.

FIG. 3A is a network 300A having a content server 305, a bridge 310, a file server 315, a file transfer station 318, and an content management system 320. The content server 305 typically receives data input from a particular source, such as a newspaper publisher. Once the data is edited and approved at the content server 305, the data is stored in a database (not shown) on the content server 305 and transmitted via the bridge 310 to the file server 315. The file server simply receives and stores data files. The connection between the content server 305 and the file server 315 can be set up as a local area network (LAN) or a wide area network (WAN), for example.

A file transfer station 318 is used by a web editor to transfer data from the file server 315 to the content management system 320. Once the data is transferred into the content management system 320, the web editor can edit and assign the data to target location(s).

Figure 3B:
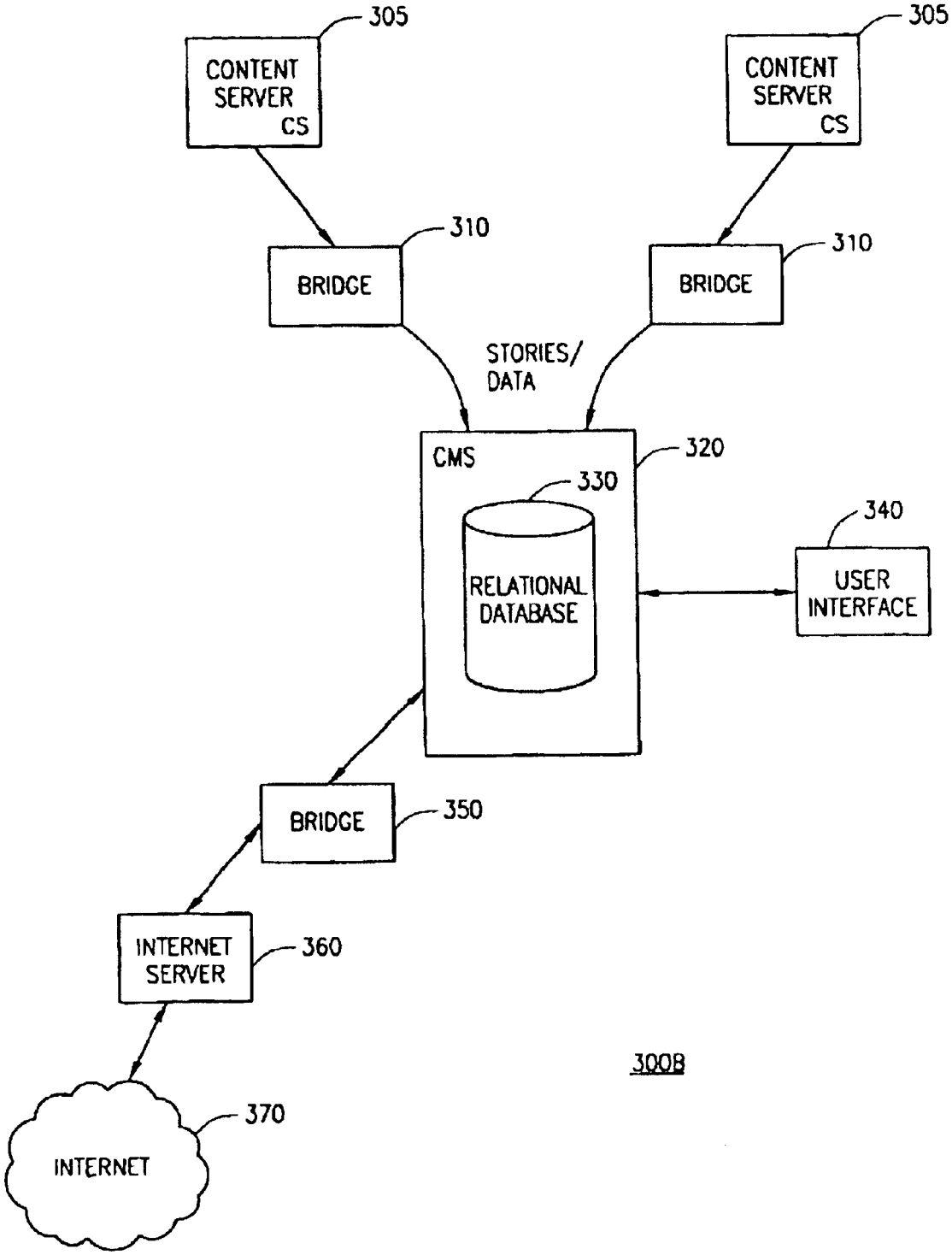
FIG. 3B is a block diagram of a first embodiment network structure of the present invention.

FIG. 3B is a first embodiment configuration of the present invention. A first embodiment network 300B primarily includes a content server 305, a bridge 310, and a content management system 320. The content server 305 typically receives data input from a particular source, such as a newspaper. Once the data is edited and approved at the content server 305, the data is stored in a database (not shown on the content server 305 and transmitted via the bridge 310 to the content management system 320. The connection between the content server 305 and the content management system 320 can be set up as a local area network (LAN) or a wide area network (WAN), for example.

The bridge 310 is a conversion mechanism for converting data from the content server 305 formatted data to the content management system 320 formatted data. The bridge may operate on the content server 305 or operate on an independent computing device. The bridge generally includes a software translation system for converting machine specific data from the content server 305 to machine specific data for the content management system 320. In addition to the bridge 310 translating the data for the specific hardware configuration of the content server 305 and the content management system 320, the bridge 310 additionally converts the data for the specific software operating on the content server 305 and the content management system 320. As indicated, story data is transmitted from the content server 305 to the content management system 320 via the bridge 310.

The content management system 320 operates on a server. Within this content management system 320, a relational database 330, for instance, is operated. A relational database 330 is one that stores data that is structured in a certain configuration. The relational database 330 can define multiple and complex relations among different data. The relational database 330 model pre-defines the relationships in a very flexible way using tables.

A user interface 340 is connected to the content management system 320. The user interface 340 may be connected in a LAN or WAN configuration, for example. The user interface 340, may operate on a separate computing device, such as a computer networked to the server operating the content management system 320. Alternatively, the user interface 340 may be a terminal operating on the server operating the content management system 320. The user interface 340 provides a graphical user interface (GUI) so that a web editor may access the data within the relational database 330. A web editor working on the user interface 340 may access, edit, assign and approve the data within the relational database 330.

A bridge 350 provides a link between the content management system 320 and an internet server 360. The bridge, like the bridge 310 linking the content server 305 to the content management system 320, translates data from the content management system 320 to the internet server 360. The bridge 350 translates the data to be exported from the content management system 320 to the internet server 360 so that the machine specific data stored in the content management system 320 is translated to machine specific data to be distributed by the internet server 360 onto the internet 370.

It should be understood that the bridges 310 and 350 are used to translate data from a specific machine operating a specific software to another machine operating specific software. These bridges are typically custom designed by a system engineer for the operator's specific application. If, for instance, a relational database 330 were replaced by a different type of database, the bridges 310 and 350 would be required to be changed by the system engineer.

Figure 4:
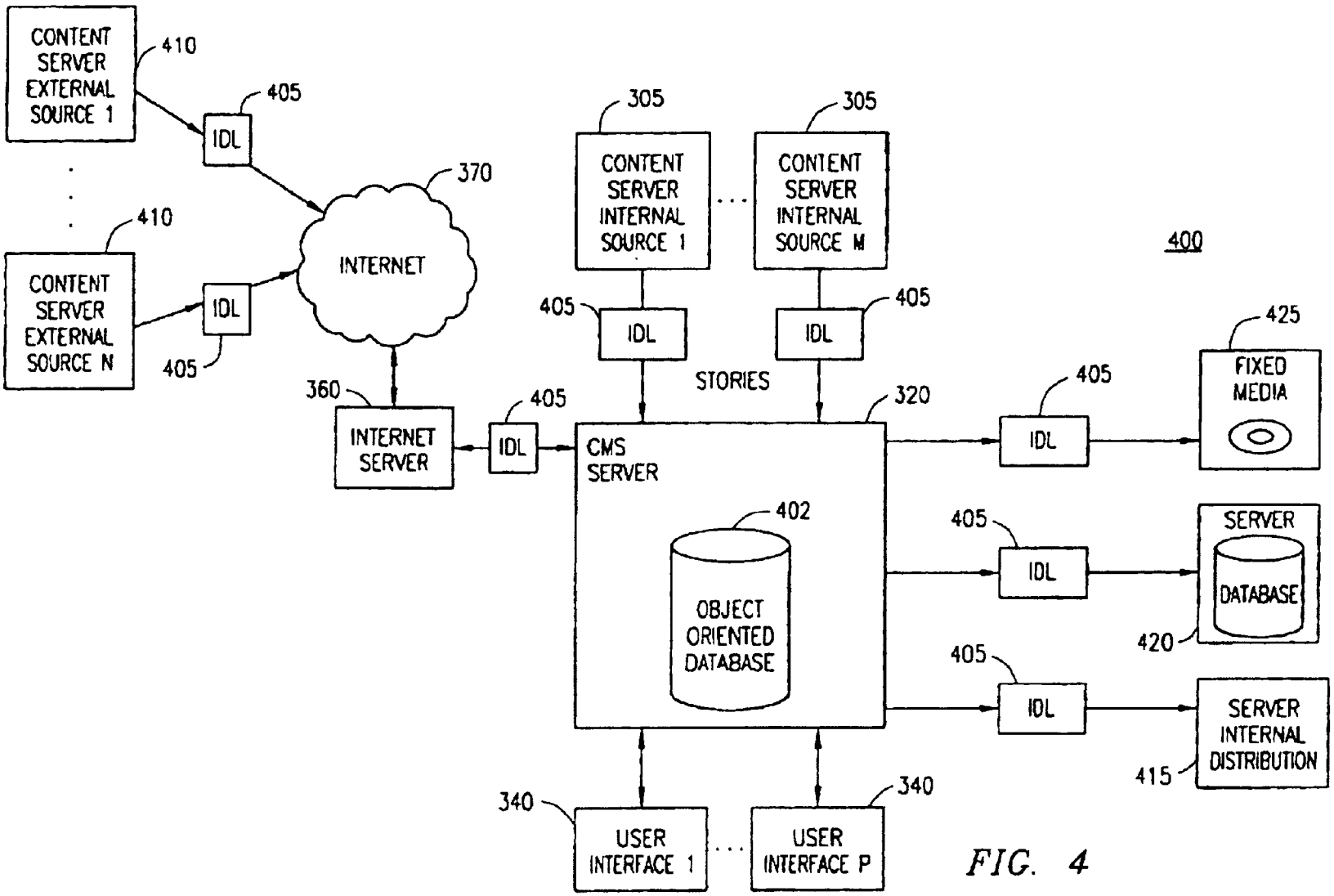
FIG. 4 is a second embodiment network structure of the present invention.

FIG. 4 is a second embodiment of the present invention having a configuration geared toward an object oriented database. A second embodiment 400 primarily includes the content server 305, an interface database language (IDL) transistor 405, and the content management system 320. The content servers 305 from internal sources 1-M receive data from traditional news sources, for example. An internal source is one that is affiliated with the operation of the content management system 320, such as a newspaper publishing division. Once the data is approved by the news editor, the data is stored and transmitted from the content server 305 to the IDL 405.

The IDL 405 translates platform or machine specific code to platform independent code. There are various types of platform independent code, such as HTML and JAVA. The IDL 405 can translate the data specific to the content server 305 into platform independent code, which is Common Object Request Broker Architecture (CORBA) or Internet Inter-ORB Protocol (IIOP) compliant. CORBA and IIOP are standards defined by a software standards group named the Object Management Group (OMG).

An object oriented database 402 operating on the content management system 320 stores the data received from the content server 305. The data received is platform independent and defined as an object, which is a format well known in the art of object oriented programming. In contrast to the relational database 330, the object oriented database 402 does not store data in a traditional data structure format. A data record stored as an object allows the database not to know or care about the type of data that is stored, but only that it is stored and managed as an object. There are several well known programs that can manage an object oriented database. Once the data is stored in the objected oriented database 402, user interfaces 340 1-P allow web editors to access the data stored in the object oriented database 402 to perform reviewing, editing, assigning, and approving functions to the data. Once the data is approved and stored in the object oriented database, a software program operating within the content management system exports the data to the assigned target locations stored with the data.

In addition to receiving data from content server 305, which is an internal source, the content management system 320 receives data from a content server 410, which is an external source (e.g., from a different traditional news organization). An IDL 405 can translate the data from the content server 410 to platform independent code to be transmitted across the internet 370. An internet server 360 can receive the data transmitted across the internet 370 and IDL 405 can translate the data to the content management system 320 for storage in the object oriented database 402.

Platform independent code can be loaded by a virtual machine, which is a software program operating on a computer platform, such as an internet browser. The virtual machine translates the platform independent code or data into a format that the computing device operating the virtual machine can read. For instance, a webpage read from the internet using a web browser can be viewed on any computer because the internet browser translates the code residing on the webpage for the specific host computer.

Once the data stored in the object oriented database 402 is edited and approved by the web editor, the data to be exported to the target location(s) are transmitted. The data can be additionally transmitted to, for example, a server 415 for internal distribution (e.g., an intranet), a server 420 having a database to store the published data, and a server 425 for reproducing the data onto fixed or tangible media (e.g., CD, tape or video).

The use of the IDL 405 is very important for this particular type of configuration and is only possible for use because of the use of the object oriented database 402. By complying with CORBA or IIOP standards, a great deal of complexity for the system engineer is eliminated in that standard translation routines can be used to convert the data from a platform dependent to a platform independent system. In addition to allowing the system engineer to adopt a simple plugin translator, the use of the object oriented database 402 makes the second embodiment of the present invention very powerful in that the object oriented database 402 is expandible with virtually no size limitations and allows the object oriented database 402 to be farmed. Another benefit of using an object oriented database 402 is the inherent stability provided by objected oriented databases.

Figure 5:
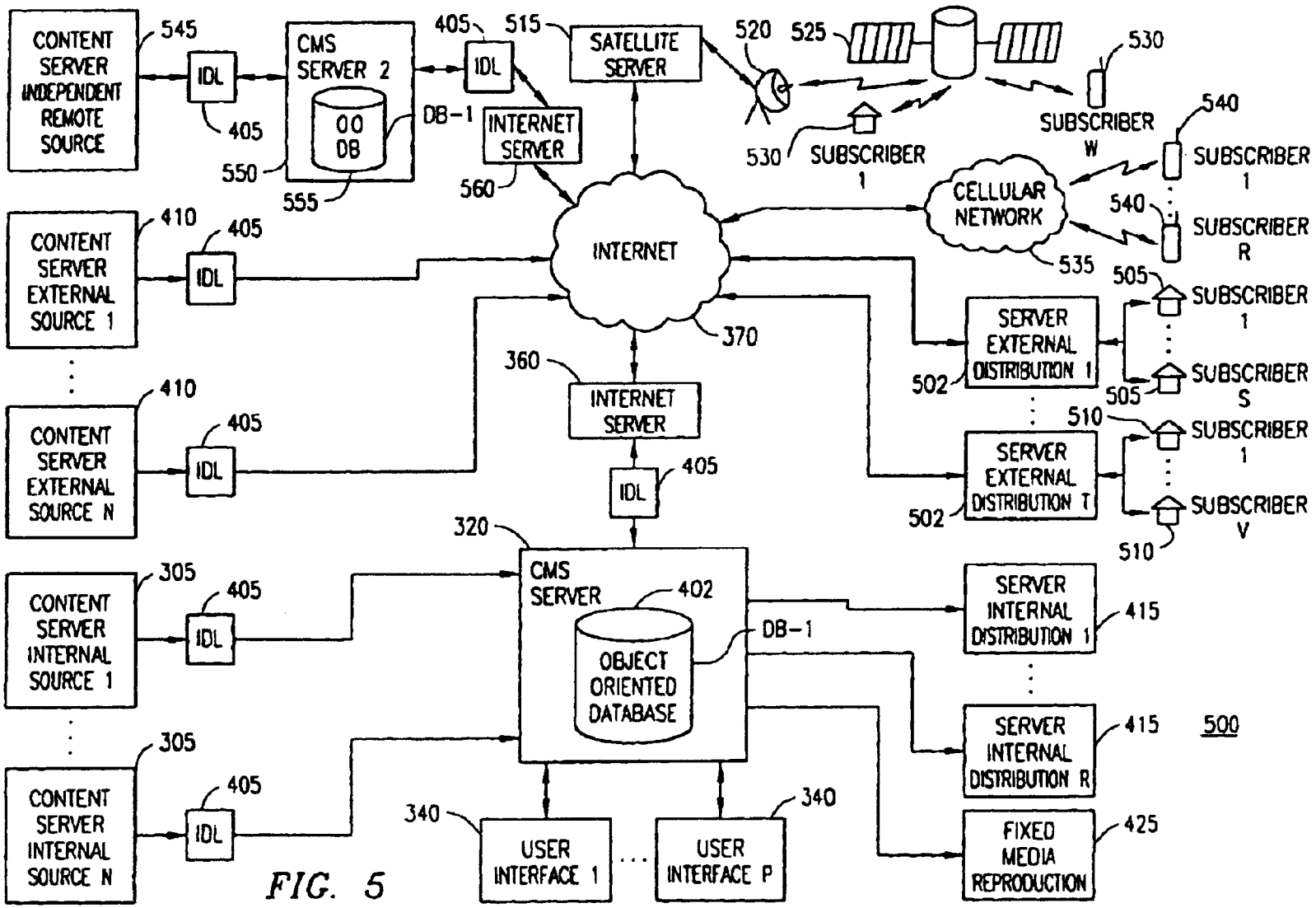
FIG. 5 is a block diagram of the second embodiment network structure of the present invention incorporated into a potentially full operating environment.

Reference is now made to FIG. 5, which shows the second embodiment network 400 along with additional components with which the content management system 320 communicates. The additional components include, for example, servers 502 1-T for external distribution. These servers 502 can distribute the data transmitted to them from the content management system 320 to individual subscribers 505 1-S and 510 1-V, respectively. The individual subscribers may be, for instance, subscribers to a cable service that owns the servers 502 for external distribution. The subscribers may review the data received from the content management system 320 that is posted on a particular news source by the cable service.

In addition to the data being communicated from the content management system 320 to the servers 502 for external distribution, the data may also be communicated to a satellite server 515, which distributes the data to a satellite transmitter 520. The satellite transmitter 520 transmits the data to a satellite 525, which in turn, transmits the data to individual subscribers 530 1-W. The individual subscribers 530 may include houses having satellite receivers for television viewing, cellular phones having satellite receivers, handheld computer devices with satellite receivers or any other computing device capable of receiving a transmission of data from a satellite.

The data transmitted from the content management system 320 may also be in communication with a cellular network 535. The cellular network 535 may transmit data received from the content management system 320 to individual subscribers 540 1-R. The individual subscribers 540 may receive the data on, for instance, cellular phones and hand held computing devices in communication with the cellular network 535.

In addition to the content server 305, which is an internal source (e.g., a newspaper affiliated with the operators of the content management system 320), the content management system 320 may also be capable of receiving data from a content server 545, which is an independent remote source (e.g., a newspaper not affiliated with the operators of the content management system 320). However, while the content server 305 transmits data directly to the content management server 320, the content server 545 transmits data to another content management system server 550, which includes another object oriented data base 555. This other content management system 550 may be used to handle a smaller publishing operation either affiliated or not affiliated with the operators of content management system 320. The data stored in the object oriented database 555 may be shared with the data stored in the object oriented database 402. In fact, both object oriented databases 402 and 555 may be designed to share all data stored in each of the databases so that each one is an identical copy of the other.

The data that is to be shared between object oriented databases 402 and 555 may be transmitted across the internet 370 by internet servers 360 and 560. The data sharing operation can be performed in a variety of ways, such as prioritizing the data so that important data can be treated as high priority and transmitted as soon as it is available on either database 402 or 555 and less important data can be treated as low priority, which can be transmitted at the end of the day as a low priority item. By having mirror images of the data within each of the object oriented databases 402 and 555, the data can be more easily transmitted across a particular network to the affiliates of each of the operators of the content management servers 320 and 550.

Another alternative for the storage of the data in the object oriented database 402 is to, for instance, store low resolution data in the object oriented database 402 so that the basic image may be viewed while maintaining the high resolution data in the content server 305. By having the high resolution images stored in the content server 305, data flow may be reduced and data storage is more manageable. It should be understood that the data contained within the object oriented database 402 must recognize and notify the system that a high resolution image may be found on a particular content server 305.

Figure 6:
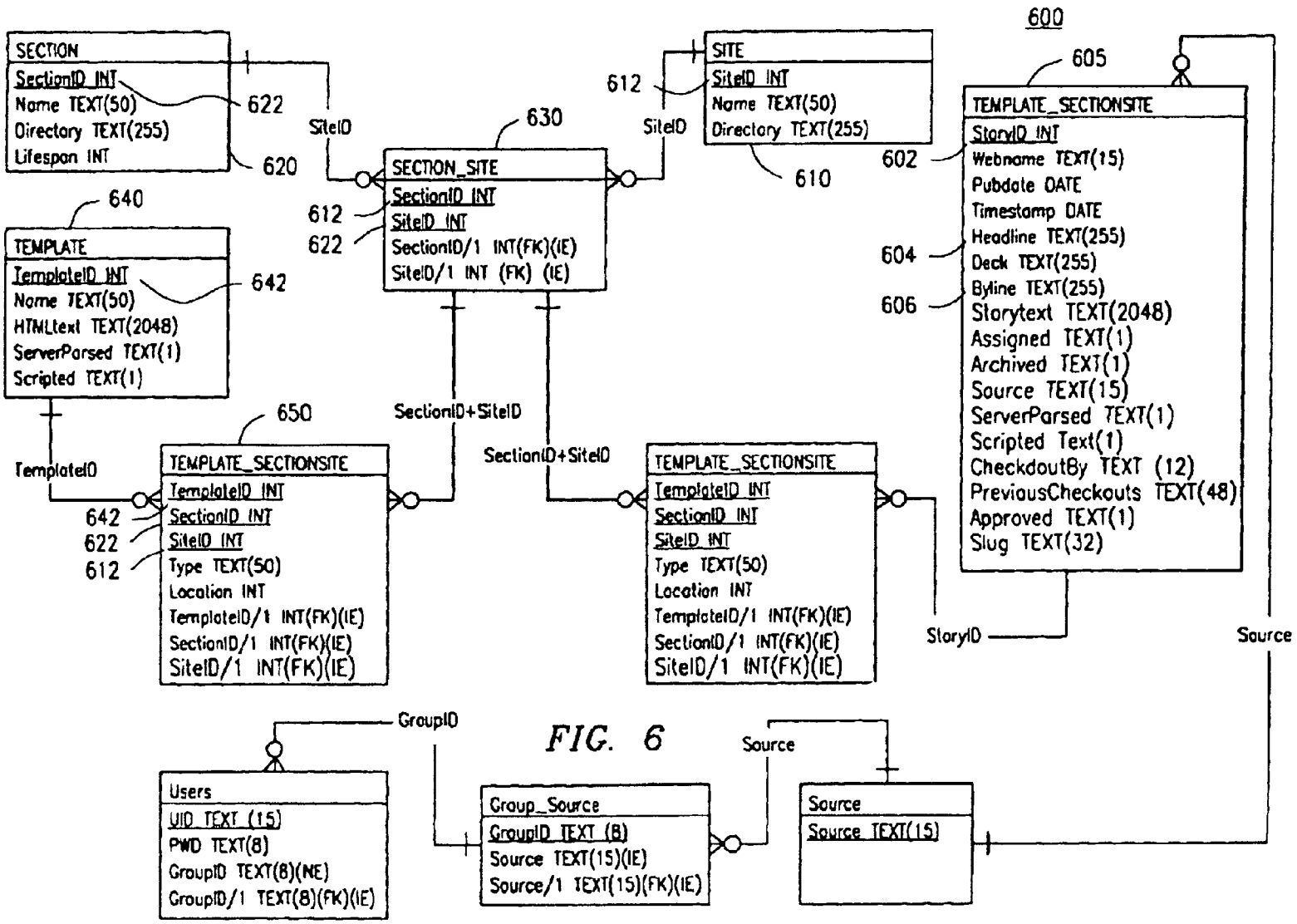
FIG. 6 is an exemplary data structure for use by the first embodiment of the present invention.

FIG. 6 shows a data structure 600 that can be used for handling the data to be stored in a database other than an object oriented database. The data structure 600 is set up in third normal form, which is a robust design for a data structure for database usage. Each of the components of the data structure 600 has a unique key so that a joining component that combines two individual components has two unique keys within it. Because of the use of unique keys, the data is protected from corruption.

For example, each story 605 has a unique StoryID key 602. Also contained within the story component is a variety of variables having certain specified data types that are used in describing the story, such as a headline 604 and a byline 606.

An example of the third normal form key structure is herein presented. A site component 610 has a unique key "SiteID" 612, which has an integer data type. A section component 620 has a unique key "SectionID" 622, which is also an integer data type. To join these two data structure components, a third data structure component SECTION_SITE 630 contains both of the unique keys, SiteID 612 and SectionID 622 so that each SECTION_SITE 630 element within the data structure 600 uniquely defines a section and site.

A template 640, which contains information describing a background template for, for instance, a web page is also a separate component in the data structure 600. Another component, TEMPLATE_SECTIONSITE 650 joins the SECTION_SITE 630 and the template 640 components, so that there are three unique keys that describe the TEMPLATE_SECTIONSITE 650.

It is important to recognize that the third normal form is useful in database development because data structures defined using third normal form prevent databases from becoming corrupt. This is due to the unique key identifiers for each data component. For example, it is not possible to have two sections within a single section site. While third normal form is not new to the development of databases, it is important to the present invention to provide stability and unrestricted growth constraints for the first embodiment (i.e., not for the object oriented database).

Figure 7:
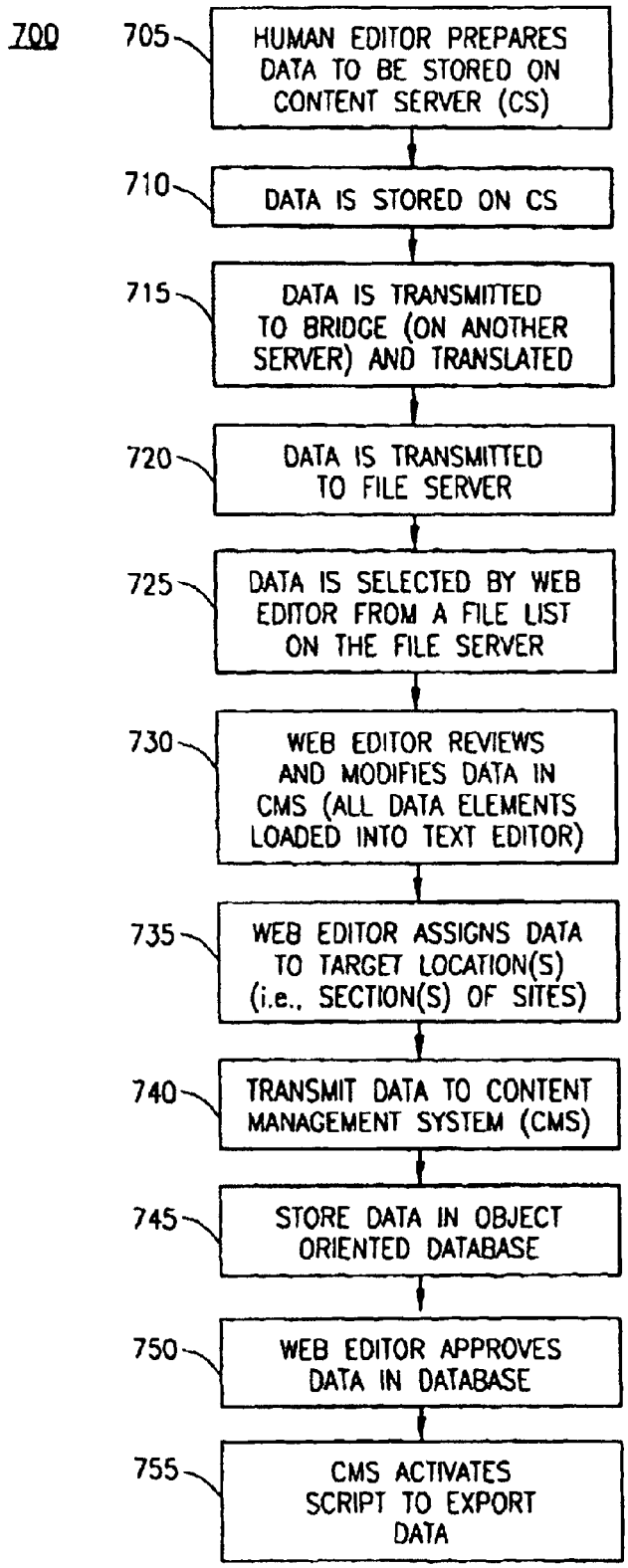
FIG. 7 is a flow diagram of an exemplary publishing workflow.

FIG. 7 is a more detailed flow diagram 700 of the workflow described generally in FIG. 1 when operating on the network 300A shown in FIG. 3A. At step 705, a human editor prepares data to be stored on the content server (CS) 305. This data being stored is the initial story, for instance, that is performed at a traditional media source. Data is stored on the content server 305 at step 710.

At step 715, the data that is stored on the content server 305 is transmitted to and translated by the bridge 310. From the bridge, the data is transmitted to the file server 315 at step 720. The data is stored in the file server.

At step 725, the data is selected by the web editor from a file list on the file server 315 using a file transfer station 318. At step 730, the web editor reviews and modifies a data file by opening the desired data file stored on the file server 315. When the data file is opened by the web editor, all data elements within the data record are loaded into the simple text editor. Because all the data elements within the data record are loaded into a simple text editor, each of the data elements must be identified by a specific ASCII code surrounding the individual data elements. For instance, a headline of a story could be identified by braces having the letters "HL" within the braces (i.e., {HL}) surrounding the headline text itself.

At step 735, the web editor assigns the data to at least one section of a particular site (i.e., website). To assign the data, the web editor must physically type the target location(s) to assign the data. Typing the target location(s) into the text editor is inefficient and time consuming, with emphasis added.

At step 740, the data is transmitted from the file transfer station 318 to the content management system 320. The data is stored in an object oriented database 325 at step 745.

At step 750, the web editor approves the data in the relational database 330. Once the data is approved, the content management system activates a script program to export the data at step 755. Although not expressly stated within the diagram, the data that is selected from the relational database 330 is checked out and again checked in once the web editor approves of the data. This check out/check in functionality is typical for content management systems of this type.

Figure 8:
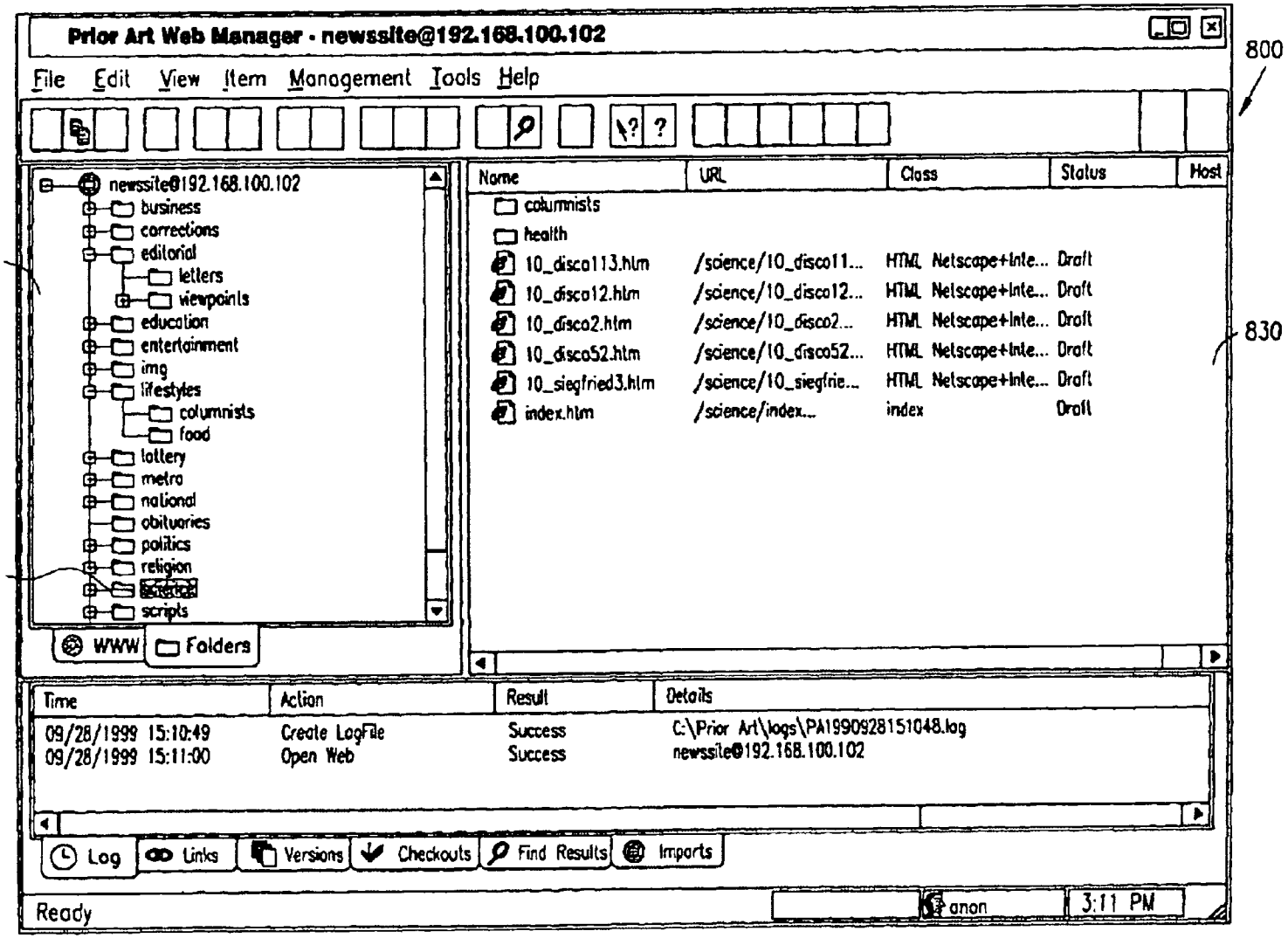
FIG. 8 (PRIOR ART)
FIG. 8 shows an exemplary screen image of a user interface.

FIG. 8 shows an exemplary screen image of a user interface 340. The user interface 340 has an interface window 800 that contains various subwindows or regions within the interface window 800. Region 810 shows a hierarchy file structure containing folders within a specific website, "newssite". A specific folder 820, "science", is highlighted and the contents of the folder 820 is shown in region 830.

The region 830 shows a number of files with a name designator, a URL, a class, and a status. As is readily identifiable, it is difficult, if not impossible, to determine specifically the contents of the files contained within the region 830. That is, the contents of the data, for instance, headline, image, and byline, are not available for the web editor to identify which data item to select for editing and assigning.

Figure 9:
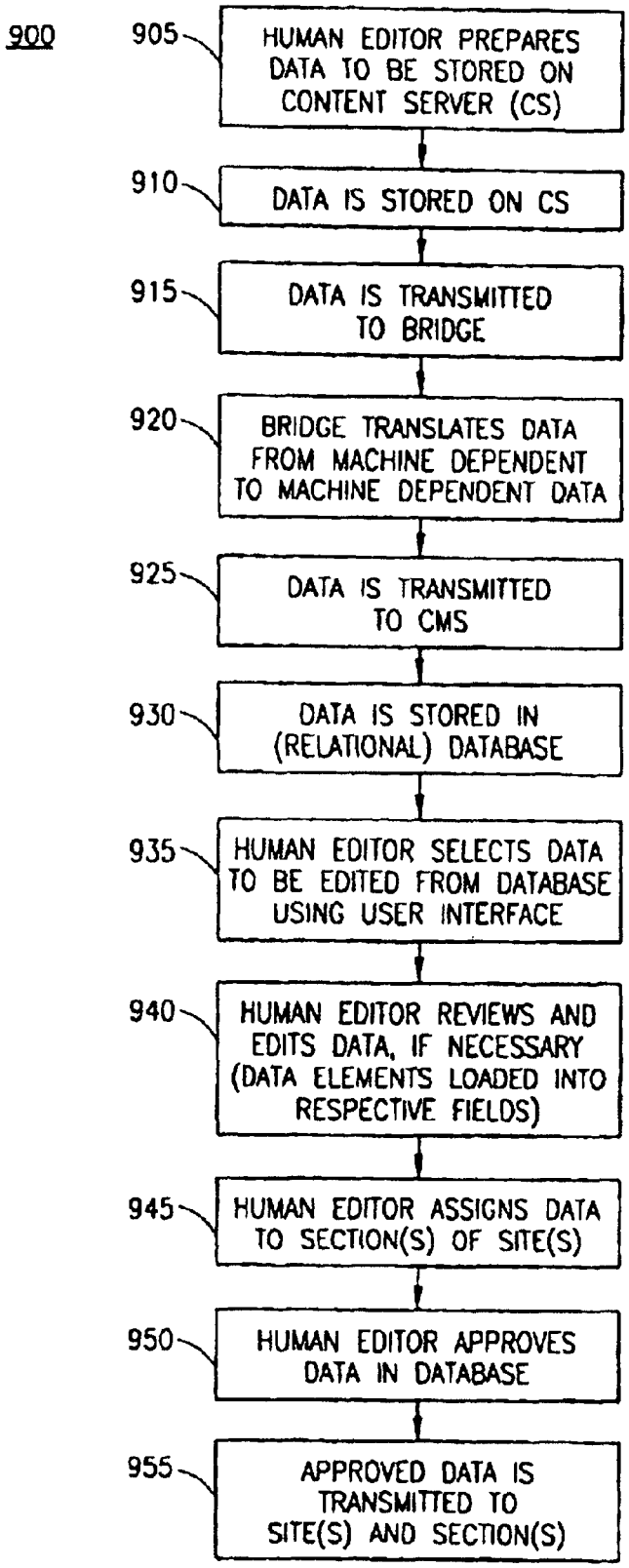
FIG. 9 is a first embodiment flow diagram of the present invention showing an exemplary workflow.

FIG. 9 represents a first embodiment flow diagram 900 showing a workflow for the present invention. At step 905, a human editor prepares data to be stored on the content server 305 for a traditional media source, such as a newspaper. At step 910, the data is stored on the content server 305.

At step 915, the data is transmitted to the bridge 310. The bridge 310 translates the data from machine dependent data to machine dependent data at step 920. At step 925, the data is transmitted to the content management system 320. The data is stored in the relational database 330 at step 930.

At step 935, a human editor ("web editor" or "operator") selects data record(s) to be edited from the relational database 330 using a user interface 340. It should be understood that the web editor selects the data record(s) from a user interface 340, which displays the data record(s) in an easy-to-read format, thereby allowing the web editor to clearly identify the contents of the data record(s).

At step 940, the web editor reviews and edits content and format of the data record(s), if necessary. Upon selecting the data record(s) to be edited, the data elements of the selected data are loaded into their own respective fields. In other words, the data elements are not all loaded into a single text editor window and identified by the specific ASCII code surrounding the data elements.

At step 945, the web editor assigns the data record(s) to at least one target location. A target location is a section within site (e.g., website), such as the science section of a particular online newspaper. This assignment process is performed by selectively choosing at least one section from a selectable field within the user interface 340.

At step 950, the web editor approves the data that is currently being edited. This approval process allows the data to be transmitted to the assigned target location(s) (i.e., section(s) and site(s)) at step 955.

Figure 10:
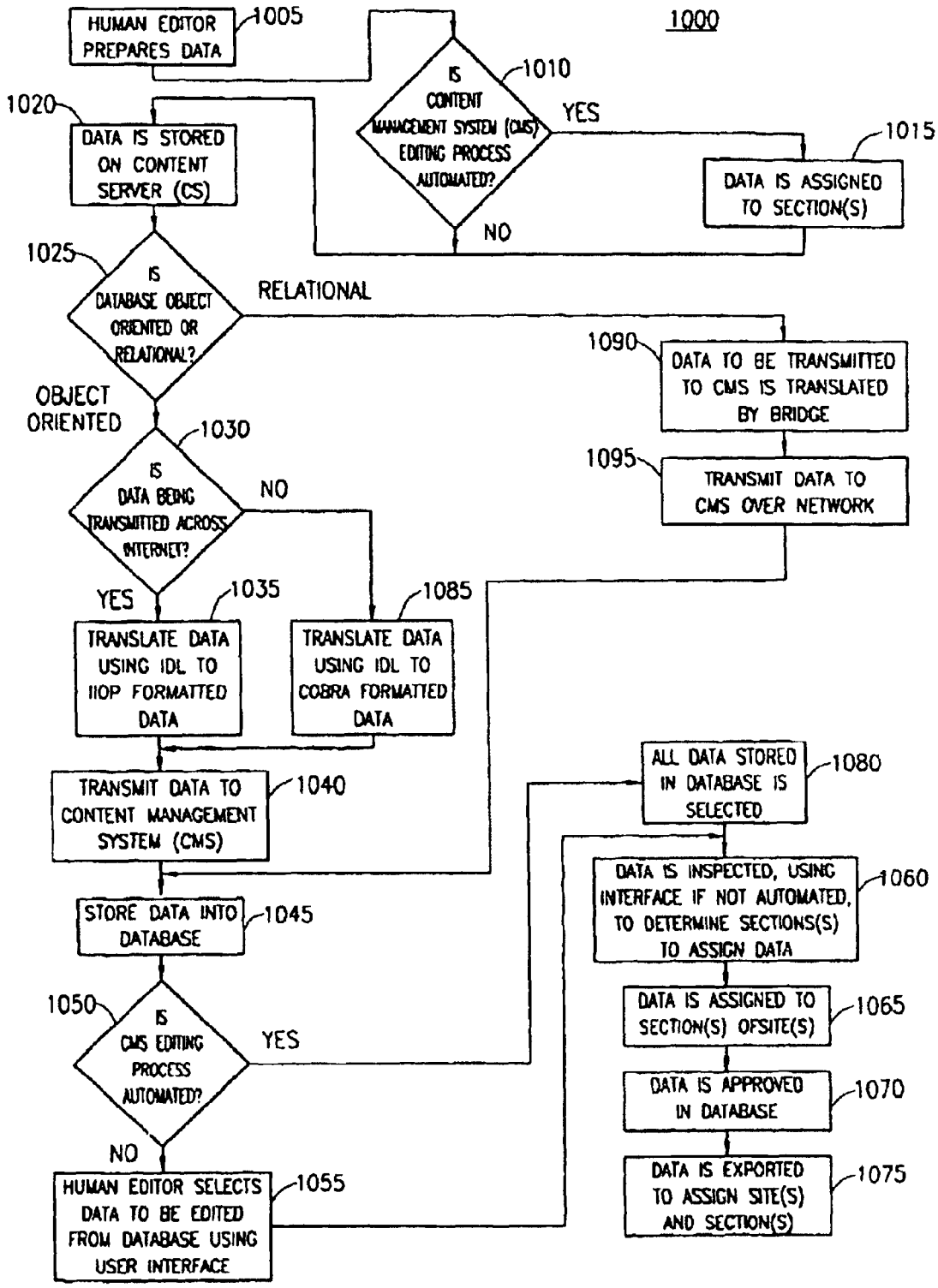
FIG. 10 is a second embodiment flow diagram of the present invention showing an exemplary workflow.

FIG. 10 is a second embodiment flow diagram 1000 for the present invention showing the workflow described generally in FIG. 2 when operating on the second embodiment network in FIG. 4. This workflow is envisioned to be utilized for a multimedia publishing operation. This embodiment is likely to be more encompassing than an actual system, but it should be understood that any particular branch or path is capable of enabling the workflow of a media operation.

At step 1005, a human editor prepares the data to be stored on the content server 305. At step 1010, a decision is made to determine whether the content management system 320 has an automated editing process. If the content management system 320 has an automated editing process, then the data is assigned at step 1015 (possibly by the human editor) to particular target location(s) for the data to be exported or distributed. The process then moves to step 1020 where the data is stored on the content server 305. If the content management system 320 does not have an automated editing process, then the process steps directly to step 1025 and the data is not stored on the content server 305.

At step 1025, it is determined whether the database stores the data in an object oriented or relational format. If the data is stored as object oriented data, then the process steps to step 1030, where it is determined whether the data is being transmitted across the internet. If the data is being transmitted across the internet, then at step 1035 the data is translated by an IDL 405 to IIOP formatted data (i.e., platform independent and internet formatted). At step 1040, the data is transmitted to the content management system 320 and then stored into the database 402 at step 1045.

At step 1050, a decision block determines whether the content management system 320 editing process is automated. If the content management system editing process is not automated, then at step 1055 the web editor selects the data to be edited from the database using a user interface 340.

At step 1060, the data is inspected by using the user interface 340 (if the content management system 320 editing process is not automated) to determine at least one section to assign the data. At step 1065, the data is assigned to at least one target location. At step 1070, the data is approved and then, at step 1075, exported to the target location(s) assigned by the web editor.

If it was determined at step 1050 that the content management system 320 editing process is automated, the content management system 320 selects all the data records stored in the database and not yet assigned for the system to assign the data records to their desired target location(s). It should be noted that since the data was already assigned at step 1015, the inspection at step 1060, assignment process at step 1065, and approval function at step 1070 is simply a matter of formality and error checking.

If at step 1030 it is determined that the data is not being transmitted across the internet, then the data is translated at step 1085 using an IDL 405 to CORBA formatted data. Again, CORBA formatted data is machine or platform independent data that complies with a certain set of standards, but is not internet compliant.

If at step 1025 it is determined that the database is a relational database, then at step 1090, the data to be transmitted to the content management system 320 from the content server 305 is translated by a bridge 310. The bridge, again, simply translates platform dependent data to another platform dependent data. The data is transmitted to the content management system 320 over the network at step 1095 and at step 1045, the data is stored into the database. In this case, the database is the relational database 330.

The workflow described hereinabove for FIGS. 9 and 10 is specifically geared toward an online publishing operation. The workflow concept for the present invention is an intellectual process rather than simply a physical one. This approach will hereinafter be clearly identifiable with regard to the description of the user interface 340 screen images of the present invention.

Figure 11:
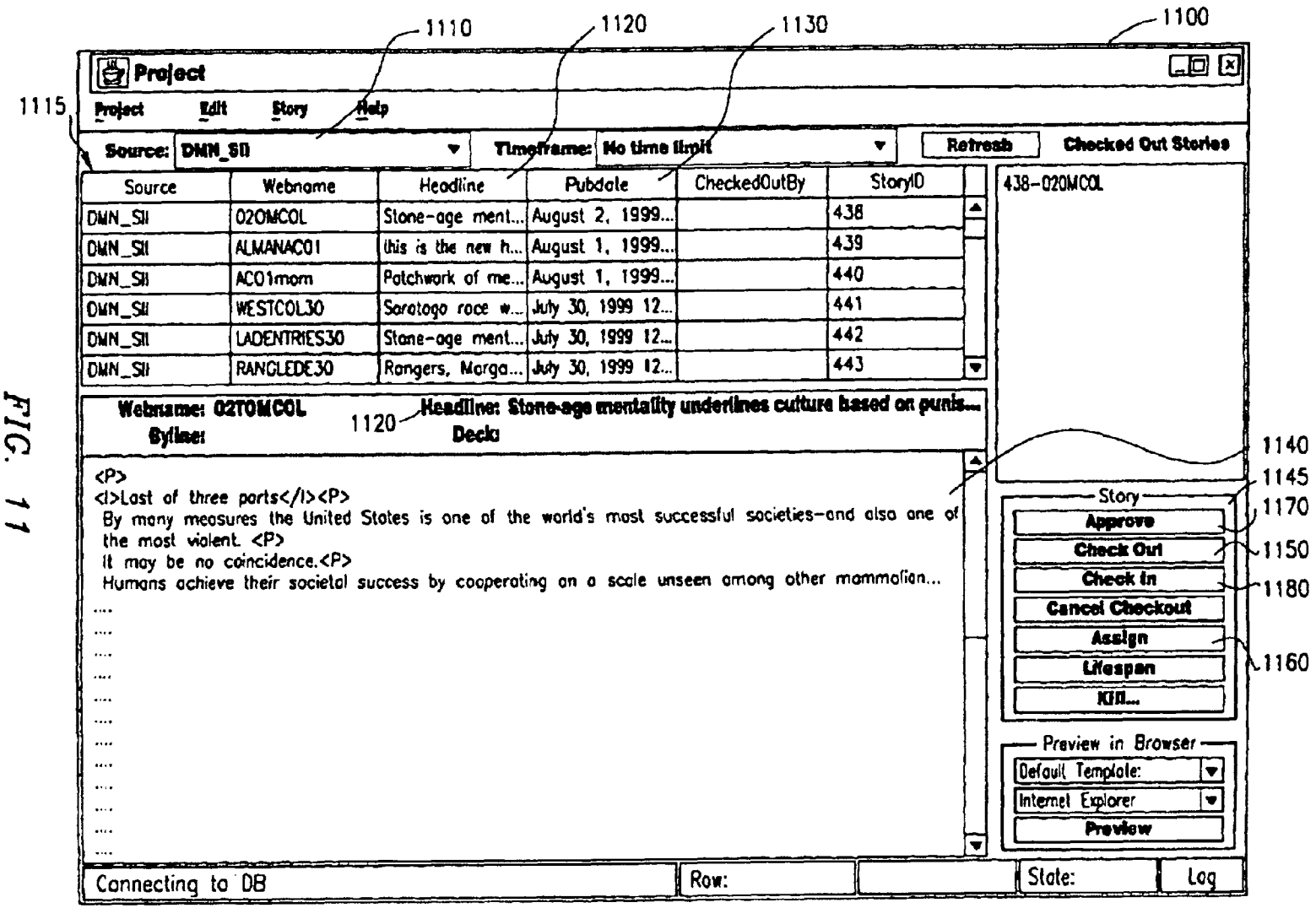
FIG. 11 is an exemplary screen image operating on the content management system according to the present invention.

FIG. 11 shows an exemplary screen image 1100 of the present invention that the web editor uses on the user interface 340 to access the data stored in the database. One of the key features with this particular user interface 340 is the source designator 1110, which indicates the source (i.e., the operators of a control server (CS)) of the data elements shown in a region 1115 stored in the database. The source designator 1110 may be implemented as a pull-down menu allowing the source of the data to be individually selectable. Each data record (i.e., each row shown in region 1115) includes a headline 1120 and a publish date 1130.

A second region 1140 shown on the user interface 340 contains the data (in this case a news story) and also contains some of the individual data components of the selected data record, such as the headline 1120. Another region 1145 on the user interface 340 contains multiple control soft-buttons for the web editor to perform or select certain functions. There exists a check out soft-button 1150 for the web editor to check out a particular story so that no other web editors check out the same story at the same time. The web editor may press the assign soft-button 1160 to assign the data or story to particular target location(s).

Once the data is assigned to a particular section, the web editor may depress an "approve" soft-button 1170 to approve the data. Once the data is approved, the web editor may press the "check-in" soft-button 1180 so that others may check out the story thereafter. It should be understood that while the data is checked out, the data may be edited in the region 1140 or the data may be automatically opened into a particular type of editor which may edit, for example, text, video, images, or audio. The user interface 340 may be set up to automatically launch another editor, which may not be part of the user interface 340. For instance, the user interface 340 may launch a specific computer editor to edit photographs.

Selecting a data record within region 1115 may be performed, for example, by using a mouse connected to the user interface 340 to move a cursor to select the data record or use arrow keys to move the highlighted row across each data record. It should be understood that the highlighted or selected data record may be automatically displayed with text, graphics, images, and/or audio or any combination thereof in the region 1140 in an automated fashion. By automatically showing the data within a data record, a web editor's task of reviewing and editing the data is more streamlined.

Figure 12:
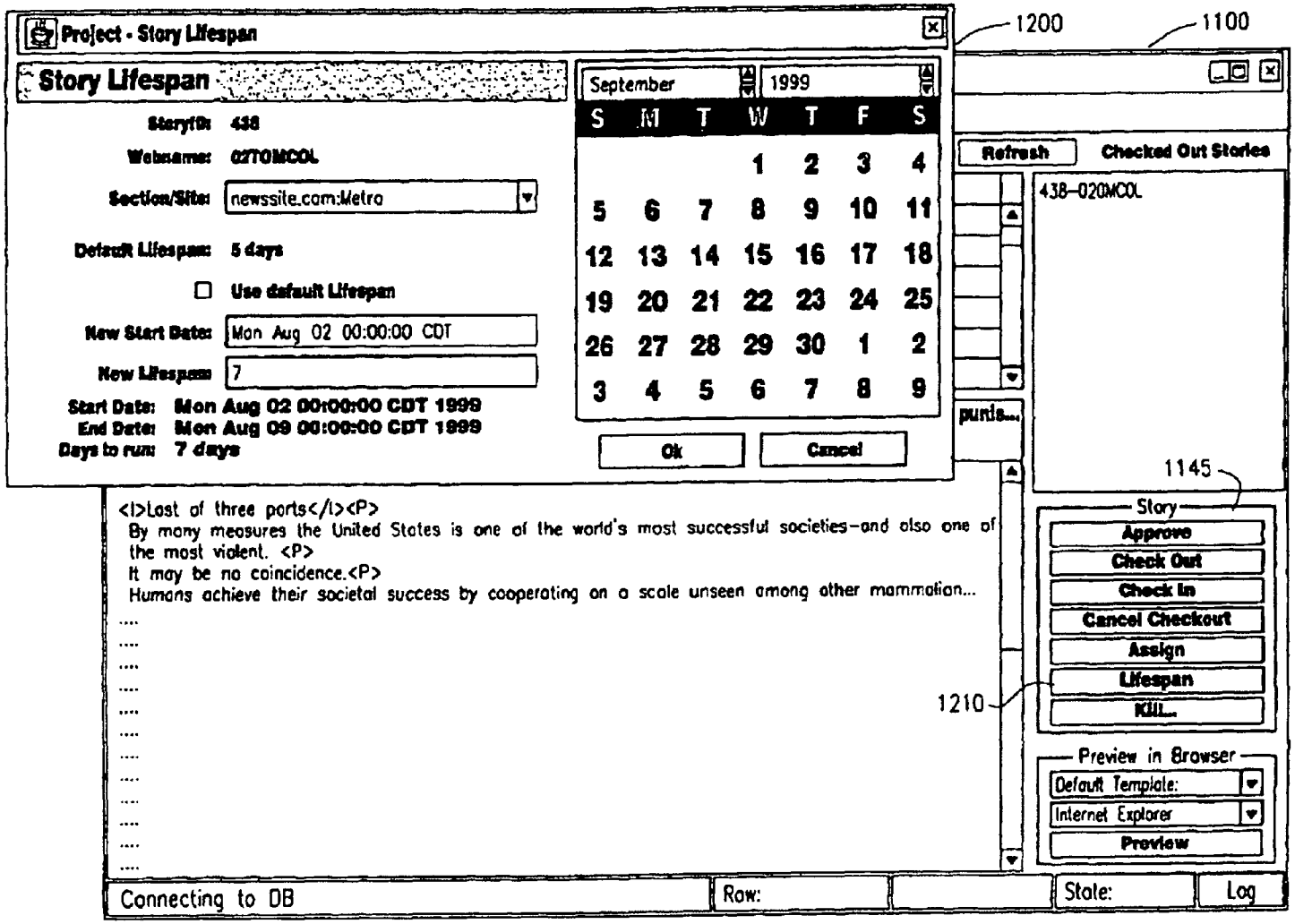
FIG. 12 is an exemplary screen image operating on the content management system showing an exemplary window for designating a story lifespan.

FIG. 12 is an exemplary screen image representation of the user interface 340 showing a user interface window 1100 and another window 1200. The web editor may assign a story lifespan in window 1200. The window 1200 may be brought up by the web editor pressing soft-button 1210 in region 1145. Also included in the window 1200 is a calendar so that the web editor can easily determine and assign a lifespan based upon calendar days.

Figure 13:
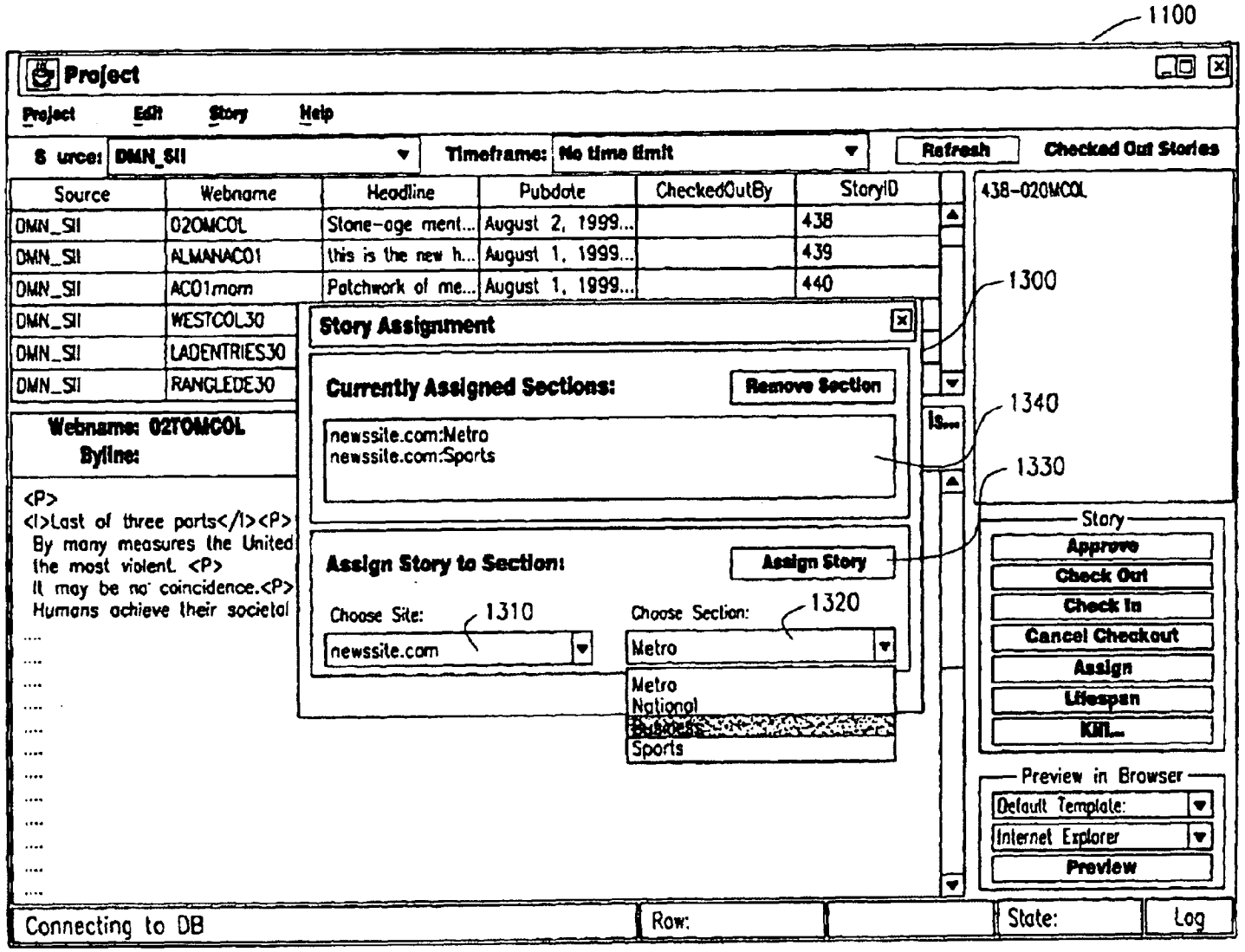
FIG. 13 is an exemplary screen image operating on the content management system showing an exemplary window for assigning a story for the present invention.

FIG. 13 is an exemplary a screen image representation of the user interface 340 that the web editor uses to assign target location(s) to the data for later export. The user interface 340 has window 1100 which can be used to bring up window 1300 by depressing soft-button 1160 in region 1145. The window 1300 contains a pull-down menu 1310, which is used to select a site for the story to be assigned. Additionally, there is a pull-down menu 1320, which is used to select section(s) within the selected site(s), which also is selectable in a pull-down menu. Once a target location is selected, an assign story soft-button 1330 may be pressed and the site/section that the story is assigned to is presented in window region 1340. Each story or data record may be assigned to at least one target location.

Figure 14:
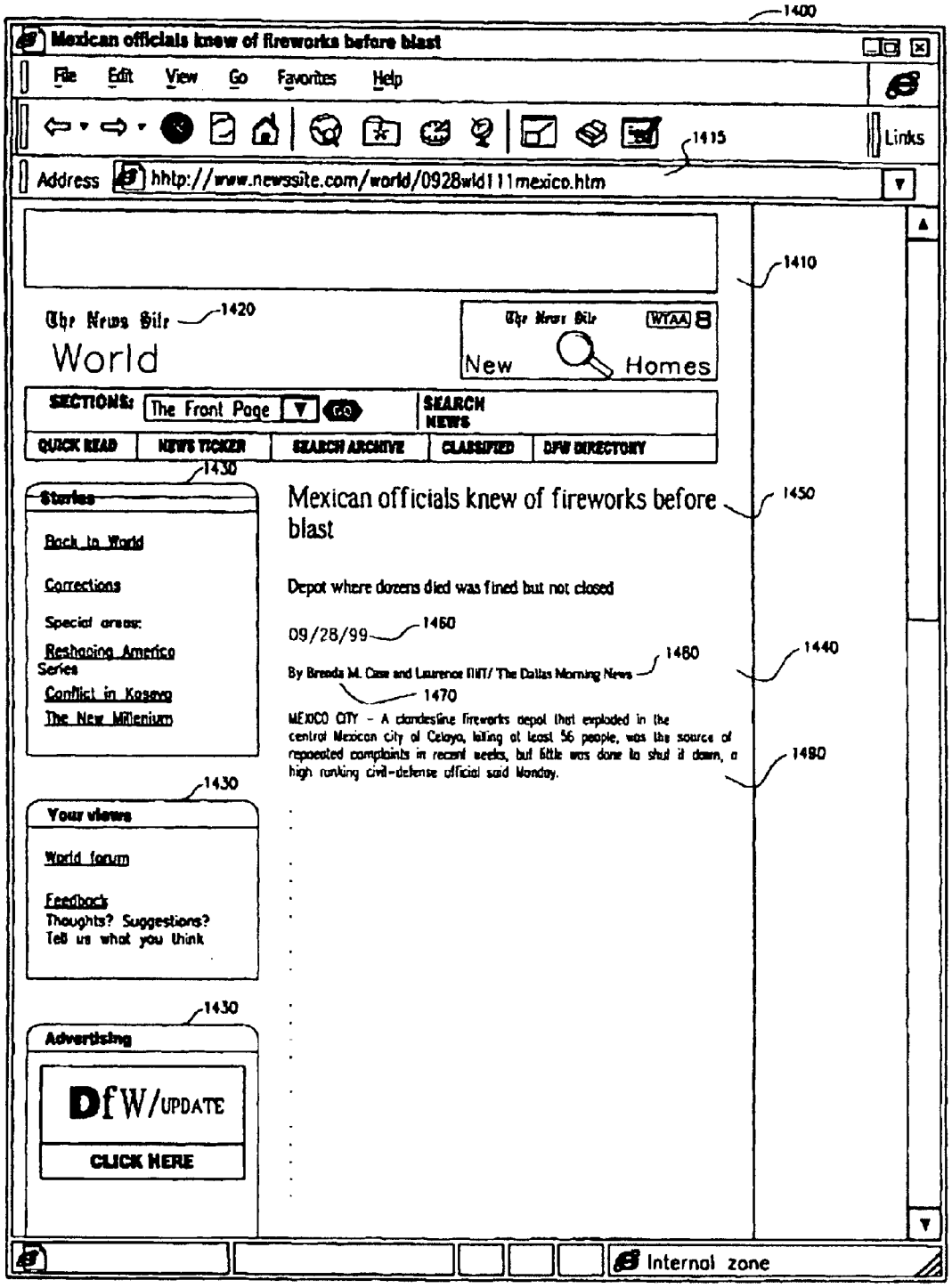
FIG. 14 is an exemplary webpage showing a news story and data elements stored in the content management system published on the webpage.

FIG. 14 represents a webpage that may be posted on the internet. Window 1400 is a browser window containing the webpage 1410. The webpage 1410 is located by the address 1415, which contains the name of the website and section (i.e., target location). The web address 1415 indicates a story within a site and section.

A template in the webpage 1410 includes the owner or publisher of the webpage 1410 in image 1420. Also included in the webpage 1410 is a variety of images 1430 containing, for instance, stories, particular views, and advertising.

The story, which is the data that was assigned to this particular site and section is show in region 1440 of the webpage 1410. In this region 1440, a headline 1450, a publish date 1460, authors 1470, source 1480, and story 1490 are shown. While this story 1490 is a text story, there may be additional types of data, such as images, video, and/or audio that may also be shown in the story region 1440.

It should be understood that the template for a particular website is used to allow each webpage within a website have the same look and feel. In other words, a website developer may wish to have regions 1430 and site image 1420 for the site owner always in the same location within each page of the website. Stories to be listed in the webpages may always be placed in the same regions within the webpage. This allows extremely large websites, which may be three hundred pages or more, to have the same look and feel, while the data, which is managed and published by the content management system 320, is updated automatically and posted to the vast number of websites within the webpages based upon the target location(s) assigned by the content management system 320.

The advantages of the present invention are many. The present invention provides a robust, stable environment having a virtually limitless size database. The present invention is an article indexing system, which is not an open system, and provides an out-of-the-box solution for online publishers. Because the present invention is not an open system, the system engineers and operators are not required to know HTML or any other programming languages to create a customized system specific to their workflow. Additionally, web editors can perform their tasks and not be required to perform the additional steps of the previous content management systems.

As the present invention is customized for online publishing, specifically newspaper publishing, it provides a final solution for those in the online publishing industry. While the present invention is customized for online publishing, it is envisioned that the present invention can be used for other online activities, such as web auctions, online job postings, online sales advertisements or any other online activity that can use a content management system with distribution functionality.

The previous description is of a preferred embodiment for implementing the invention, and the scope of the invention should not necessarily be limited by this description. The scope of the present invention is instead defined by the following claims.

What is claimed is:

1. A method for a news gathering and publishing group to collect, edit, and publish news stories utilizing a content management system, said method comprising:

receiving news content from at least one author, the news content including multiple elements;

storing the news content in a database by the content management system;

receiving a request to access the news content by an editor;

displaying the news content for review by the editor, said displaying including forming multiple display regions to display selected ones of the multiple elements of the news content;

providing editing capability for the editor to alter the elements of the news content;

receiving an indication to set a notifier indicative of the news content being approved for dissemination;

displaying a visual identifier representative of the notifier being set;

storing the notifier in the database in association with the news content;

maintaining a list of network target locations interested in certain news content; and assigning the news content to at least one network target location selected from the list of network target locations to send the news content.

2. The method according to claim 1, further comprising operating the content management system on a distributed network.

3. The method according to claim 1, further comprising forming the list of network target locations based on subscribers requesting certain news content to be sent from the news gathering and publishing group.

4. The method according to claim 1, further comprising sending the news content to the assigned at least one network target locations in response to said assigning of the news content.

5. The method according to claim 4, wherein said sending is performed automatically.

6. A system for a news gathering and publishing group to collect, edit, and publish news stories utilizing a content management system, said system comprising:

means for receiving news content from at least one author, the news content including multiple elements;

means for storing the news content in a database by the content management system, said means for storing being in communication with said means for receiving the news content;

means for receiving a request to access the news content by an editor, said means for receiving the request being in communication with said means for storing the news content;

means for displaying the news content for review by the editor, said means for displaying including forming multiple display regions to display selected ones of the multiple elements of the news content, and further being in communication with said means for receiving the request;

means for providing editing capability for the editor to alter the elements of the news, said means for providing editing capability in communication with said means for displaying;

means for receiving an indication to set a notifier indicative of the news content being approved for dissemination, said means for receiving the indication being in communication with said means for providing editing capability;

means for displaying a visual identifier representative of the notifier being set, said means for displaying the visual identifier in communication with said means for receiving the indication to set the notifier;

means for storing the notifier in the database in association with the news content, said means for storing the notifier in communication with said means for receiving the indication;

means for maintaining a list of network target locations interested in certain news content, said means for maintaining the list being in communication with said means for storing the notifier; and means for assigning operable to assign the news content to at least one network target location selected from the list of network target locations to send the news content, said means for assigning the news content in communication with said means for maintaining the list of network target locations.

7. The system according to claim 6, further comprising means for operating the content management system on a distributed network.

8. The system according to claim 6, further comprising means for forming the list of network target locations based on subscribers requesting certain news content to be sent from the news gathering and publishing group.

9. The system according to claim 6, further comprising means for sending the news content to the assigned at least one network target location in response to the news content being assigned.

10. The method according to claim 9, wherein said means for sending is operable to automatically send the news content.

* * * * *